United States Patent
Berger

(10) Patent No.: US 6,781,135 B2
(45) Date of Patent: Aug. 24, 2004

(54) UNIVERSAL EUV IN-BAND INTENSITY DETECTOR

(75) Inventor: Kurt W. Berger, Livermore, CA (US)

(73) Assignee: EUV, LLC, Santa Clara, CA (US)

( * ) Notice: Subject to any disclaimer, the term of this patent is extended or adjusted under 35 U.S.C. 154(b) by 0 days.

(21) Appl. No.: 10/301,080

(22) Filed: Nov. 21, 2002

(65) Prior Publication Data

US 2004/0099808 A1 May 27, 2004

(51) Int. Cl.[7] .......................................... H01L 31/0328
(52) U.S. Cl. ................................ 250/372; 250/370.01
(58) Field of Search ............................ 250/372, 365, 250/370.01; 356/400, 401, 500; 204/298.07

(56) References Cited

U.S. PATENT DOCUMENTS

| | | | |
|---|---|---|---|
| 5,567,942 A | | 10/1996 | Lee et al. |
| 5,598,014 A | * | 1/1997 | Barany et al. ............... 257/187 |
| 5,939,726 A | | 8/1999 | Wood |
| 6,130,431 A | | 10/2000 | Berger |
| 6,521,101 B1 | * | 2/2003 | Skulina et al. ......... 204/192.27 |
| 2003/0058429 A1 | * | 3/2003 | Schriever .................... 355/133 |

* cited by examiner

Primary Examiner—Constantine Hannaher
Assistant Examiner—Otilia Gabor
(74) Attorney, Agent, or Firm—Fliesler Meyer LLP

(57) ABSTRACT

Extreme ultraviolet light is detected using a universal in-band detector for detecting extreme ultraviolet radiation that includes: (a) an EUV sensitive photodiode having a diode active area that generates a current responsive to EUV radiation; (b) one or more mirrors that reflects EUV radiation having a defined wavelength(s) to the diode active area; and (c) a mask defining a pinhole that is positioned above the diode active area, wherein EUV radiation passing through the pinhole is restricted substantially to illuminating the diode active area.

19 Claims, 3 Drawing Sheets

UNIVERSAL EUV IN-BAND INTENSITY DETECTOR

This invention was made with Government support under Contract No. DE-AC04-94-AL85000 awarded by the U.S. Department of Energy to Sandia Corporation. The Government has certain rights to the invention.

FIELD OF THE INVENTION

The invention relates to a detector device that is particularly useful for measuring EUV in-band intensity in photolithography systems. The detector can be readily adapted as a transferable standard from synchroton systems to laser-produced plasma radiation sources.

BACKGROUND OF THE INVENTION

In general, lithography refers to processes for pattern transfer between various media. A lithographic coating is generally a radiation-sensitized coating suitable for receiving a cast image of the subject pattern. Once the image is cast, it is indelibly formed in the coating. The recorded image may be either a negative or a positive of the subject pattern. Typically, a "transparency" of the subject pattern is made having areas which are selectively transparent or opaque to the impinging radiation. Exposure of the coating through the transparency placed in close longitudinal proximity to the coating causes the exposed area of the coating to become selectively crosslinked and consequently either more or less soluble (depending on the coating) in a particular solvent developer. The more soluble (i.e., uncrosslinked) areas are removed in the developing process to leave the pattern image in the coating as less soluble crosslinked polymer.

Projection lithography is a powerful and essential tool for microelectronics processing and has supplanted proximity printing as described in the previous paragraph. "Long" or "soft" x-rays (a.k.a. Extreme UV) (wavelength range of 10 to 20 nm) are now at the forefront of research in efforts to achieve smaller transferred feature sizes. With projection photolithography, a reticle (or mask) is imaged through a reduction-projection (demagnifying) lens onto a wafer. Reticles for EUV projection lithography typically comprise a glass substrate coated with an EUV reflective material and an optical pattern fabricated from an EUV absorbing material covering portions of the reflective surface. In operation, EUV radiation from the illumination system (condenser) is projected toward the surface of the reticle and radiation is reflected from those areas of the reticle reflective surface which are exposed, i.e., not covered by the EUV absorbing material. The reflected radiation is re-imaged to the wafer using a reflective optical system and the pattern from the reticle is effectively transcribed to the wafer.

A source of EUV radiation is the laser-produced plasma EUV source, which depends upon a high power, pulsed laser (e.g., a yttrium aluminum garnet ("YAG") laser), or an excimer laser, delivering 500 to 1,000 watts of power to a 50 $\mu$m to 250 $\mu$m spot, thereby heating a source material to, for example, 250,000° C., to emit EUV radiation from the resulting plasma. Plasma sources are compact, and may be dedicated to a single production line so that malfunction does not close down the entire plant. A stepper employing a laser-produced plasma source is relatively inexpensive and could be housed in existing facilities. It is expected that EUV sources suitable for photolithography that provide bright, incoherent EUV radiation and that employ physics quite different from that of the laser-produced plasma source will be developed. One such source under development is the EUV discharge source.

EUV lithography machines for producing integrated circuit components are described for example in U.S. Pat. No. 6,031,598 to Tichenor et al. Referring to FIG. 4, the EUV lithography machine comprises a main vacuum or projection chamber 2 and a source vacuum chamber 4. Source chamber 4 is connected to main chamber 2 through an airlock valve (not shown) which permits either chamber to be accessed without venting or contaminating the environment of the other chamber. Typically, a laser beam 30 is directed by turning mirror 32 into the source chamber 4. A high density gas, such as xenon, is injected into the plasma generator 36 through gas supply 34 and the interaction of the laser beam 30, and gas supply 34 creates a plasma giving off the illumination used in EUV lithography. The EUV radiation is collected by segmented collector 38, that collects about 30% of the available EUV light, and the radiation 40 is directed toward the pupil optics 42. The pupil optics consists of long narrow mirrors arranged to focus the rays from the collector at grazing angles onto an imaging mirror 43 that redirects the illumination beam through filter/window 44. Filter 44 passes only the desired EUV wavelengths and excludes scattered laser beam light in chamber 4. The illumination beam 45 is then reflected from the relay optics 46, another grazing angle mirror, and then illuminates the pattern on the reticle 48. Mirrors 38, 42, 43, and 46 together comprise the complete illumination system or condenser. The reflected pattern from the reticle 48 then passes through the projection optics 50 which reduces the image size to that desired for printing on the wafer. After exiting the projection optics 50, the beam passes through vacuum window 52. The beam then prints its pattern on wafer 54.

Although no longer under serious consideration for high-volume commercial fabrication applications, synchrotron sources play an extremely important role in the development of EUV lithography technology. Being readily available, highly reliable, and efficient producers of EUV radiation, synchrotron radiation sources are well suited to the development of EUV lithography. These sources are currently used for a variety of at-wavelength EUV metrologies such as reflectometry, interferometry, and scatterometry.

As is apparent, lithography systems include a number of vacuum compartments through which EUV radiation is processed. Measuring and regulating the EUV radiation intensity through the lithography system is critical to maximizing performance. Prior art techniques for measuring the flux typically employed devices with EUV-sensitive vacuum photodiodes, which were difficult to calibrate. The art is in need of a reliable, cost effective EUV radiation intensity detector that is able to survive large pressure impulses without affecting calibration. The detector should also have a compact, noise immune design.

SUMMARY OF THE INVENTION

The present invention is based in part on the development of a rugged universal in-band detector for detecting extreme ultraviolet radiation that includes:

(a) an EUV sensitive photodiode having a diode active area that generates a current responsive only to EUV radiation;
(b) one or more mirrors that reflects EUV radiation having a defined wavelength(s) to the diode active area; and
(c) a mask defining a pinhole that is positioned above the diode active area, wherein EUV radiation, generated on a remote target, is imaged and aperture through the pinhole.

In a preferred embodiment, the detector comprises a housing assembly that has:
  (i) a chamber in which the EUV sensitive photodiode is positioned; and
  (ii) an entrance through which EUV radiation enters the chamber.

The robust universal in-band detector has a number of advantages over conventional EUV detectors including higher intrinsic calibration accuracy, precision, and mechanic robustness in a vacuum environment.

DETAILED DESCRIPTION OF THE PREFERRED EMBODIMENTS

Figure 1:
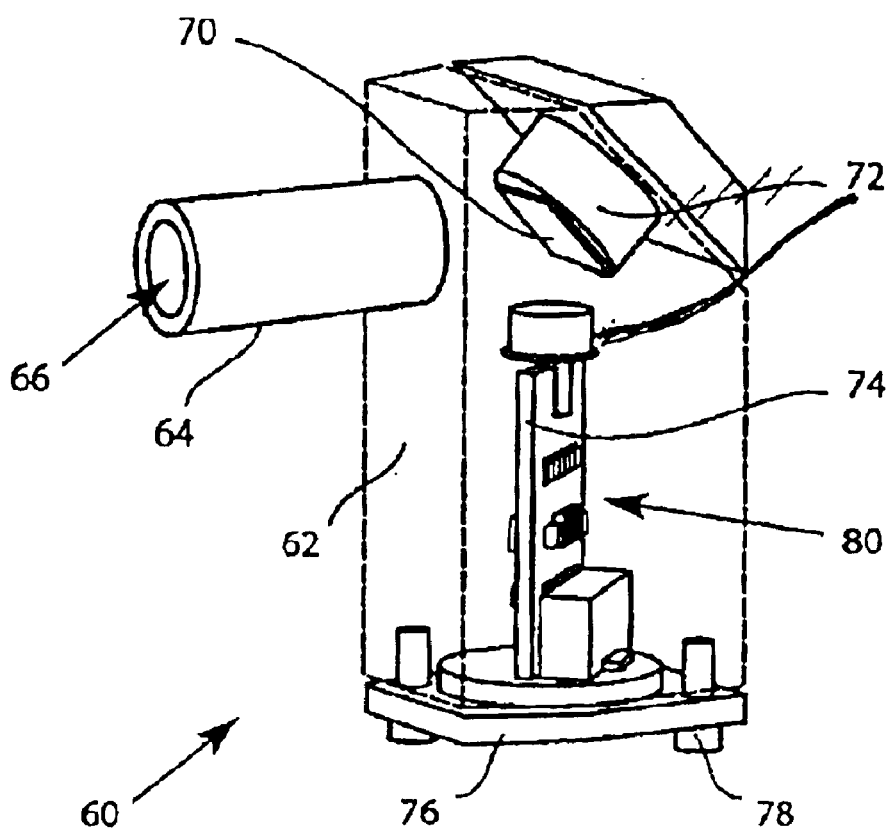
FIG. 1 is a partially opened perspective view of the detector device.

As illustrated in FIG. 1, the EUV in-band intensity detector 60 includes housing 62 that defines a chamber 80 into which a detector assembly and a amplifier assembly are positioned, both assemblies are described further herein. The housing is attached to an elongated member 64 having a bore 66 that is opened to the external environment. The bore 66 serves as an entrance for radiation and the length of the bore collimates the radiation as it reaches chamber 80. Typically, the bore has a diameter that ranges from 0.200 in. (0.508 cm) to 0.375 in. (0.953 cm). Positioned inside chamber 80 and directly along the pathway defined by bore 66 is a mirror 70 that reflects radiation onto photodiode assembly 72. Finally, detector 60 also includes an amplifier assembly 74. The base 76 of housing 62 can be attached at suitable locations within a photolithography system with bolts 78 or other securing devices.

Housing 62 performs several functions. First, the housing provides a mechanical reference that allows the sensor end-user to correctly align EUV light from a radiation source through bore 66 and into photodiode assembly 72. Second, the housing functions as an electronic shielding structure that prevents the induction of electronic and magnetic fields into the photodiode assembly 72 and the amplifier assembly 74. In this regard, the housing is preferably made of a vacuum compatible material that has an electrically conductive surface. For example, the housing can be made of aluminum that is nickel plated to enhance the surface conductivity of the aluminum body. Third, the housing functions as a mounting fixture used to hold the sensor at a fixed reference position.

Figure 2:
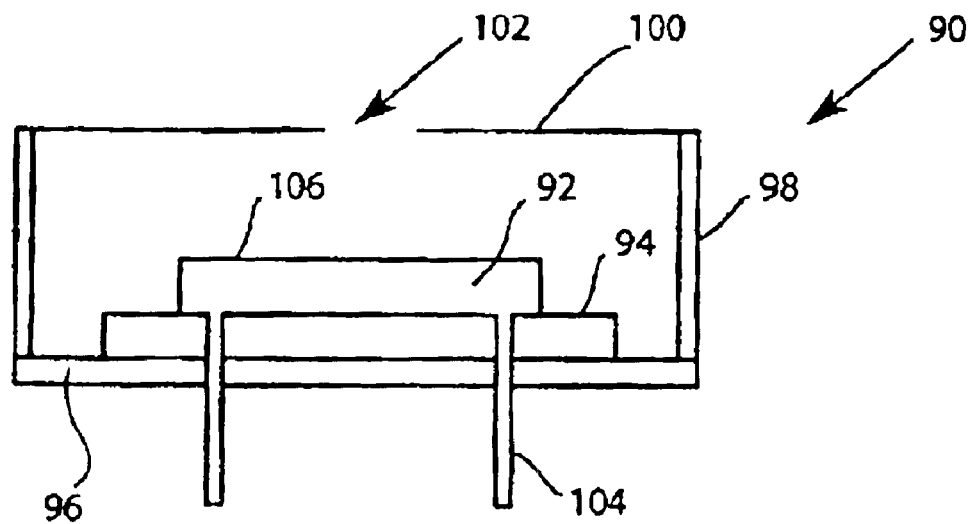
FIG. 2 is a cross sectional view of the photodiode within a transistor-outline package.

As shown in FIG. 2, the photodiode assembly 90 includes an EUV sensitive photodiode 92 that is secured on a mounting pedestal 94 and that is enclosed by a cap or cover 98. Leads 104 from photodiode 92 protrude through mounting pedestal and base structure 96. The top surface 100 of the cap 98 serves as a mask that is made of material which does not transmit radiation that is typically generated in photolithographic systems. Therefore, the only EUV radiation that reaches the active area 106 of the photodiode 92 is that which travels through pinhole 102. Cap 98 is preferably made of a material that absorbs radiation having wavelengths between 900 m and 10 m which includes EUV and contaminating radiation. Preferred materials include, for example, anodized aluminum or tungsten.

In a similar vein, the size of pinhole 102 is selected so that essentially all of the EUV radiation that passes through pinhole 102 is restricted to a defined, region of the active area 106. The size of the pinhole will depend on the dimensions of the other components and their relative positions within the photodioade assembly, e.g., distance from pinhole 102 to active area 106. The pinhole typically will have a diameter that ranges from 0.2 mm to 0.4 mm which corresponds to an area of from 0.031 mm$^2$ to 0.126 mm$^2$.

The photodiode active surface 106 is preferably coated with an EUV-transmissive energy filter prevents the detector from detecting energies lower than about 10 eV, thereby rendering the detector insensitive to UV, visible, IR, and other contaminating radiation, while providing only about a 30% loss to photons at the 100 eV range. In effect, the filter material renders the photodiode non-responsive to the contaminating radiation. Materials from which the EUV-transmissive filter can be selected include beryllium, zirconium, niobium and yttrium, which can operate to block photons of energies lower than that of the desired EUV radiation while passing a significant quantity of the EUV photons.

As is apparent, the EUV-transmissive filter is required only where the photodiode has a diode active area that is EUV sensitive and that is sensitive to contaminating radiation as well. This is the case with commercially available photodiode. However, if photodiodes become available which are EUV sensitive only, then the EUV-transmissive filter is not needed. It should also be noted that the filter can also be disposed remotely from the photodiode, or other means of controlling the wavelength and energy of the impinging radiation, such as use of a monochromatic source, can be utilized without inventive departure from the spirit and scope of the invention. However, the preferred method by which the photodiode is fabricated employs a filter, or an equivalent thereto, in order to shield the photodiode active area. The thickness of the material depends, among other things, on the material(s) used. For zirconium, the thickness typically ranges from 60 nm to 300 nm.

Photodiodes are well known in the art and are particulary suited since they exhibit the requisite dynamic range from EUV lithography applications that is typically not attainable with other detector technologies such as CCD, phosphor, or pyro-electric devices. A suitable commercially available photodiode for applications in vacuum extreme ultraviolet radiation is a silicon p-n junction photodiode, model AXUV series from International Radiation Detectors Inc. (Torrance Calif.). Another suitable device is a monolithic pattern-sensitive detector which employs a precisely defined reference pattern formed over a shallow junction photodiode which is described in U.S. Pat. No. 6,130,431 to Berger, which is incorporated herein by reference. Photodiodes also provide excellent sensitivity for the intensities that are present in photolithography systems.

The amplifier assembly 74 is used to increase detected signal of the photodiode to that which is substantially above the background electronic noise level. Since the amount of light admitted through the pinhole 102 of the photodiode detector assembly 90 as shown in FIG. 2 is small, the amplifier is necessary to boost the photodiode signal above a perceptible level, usually about 500 mV.

Figure 3:
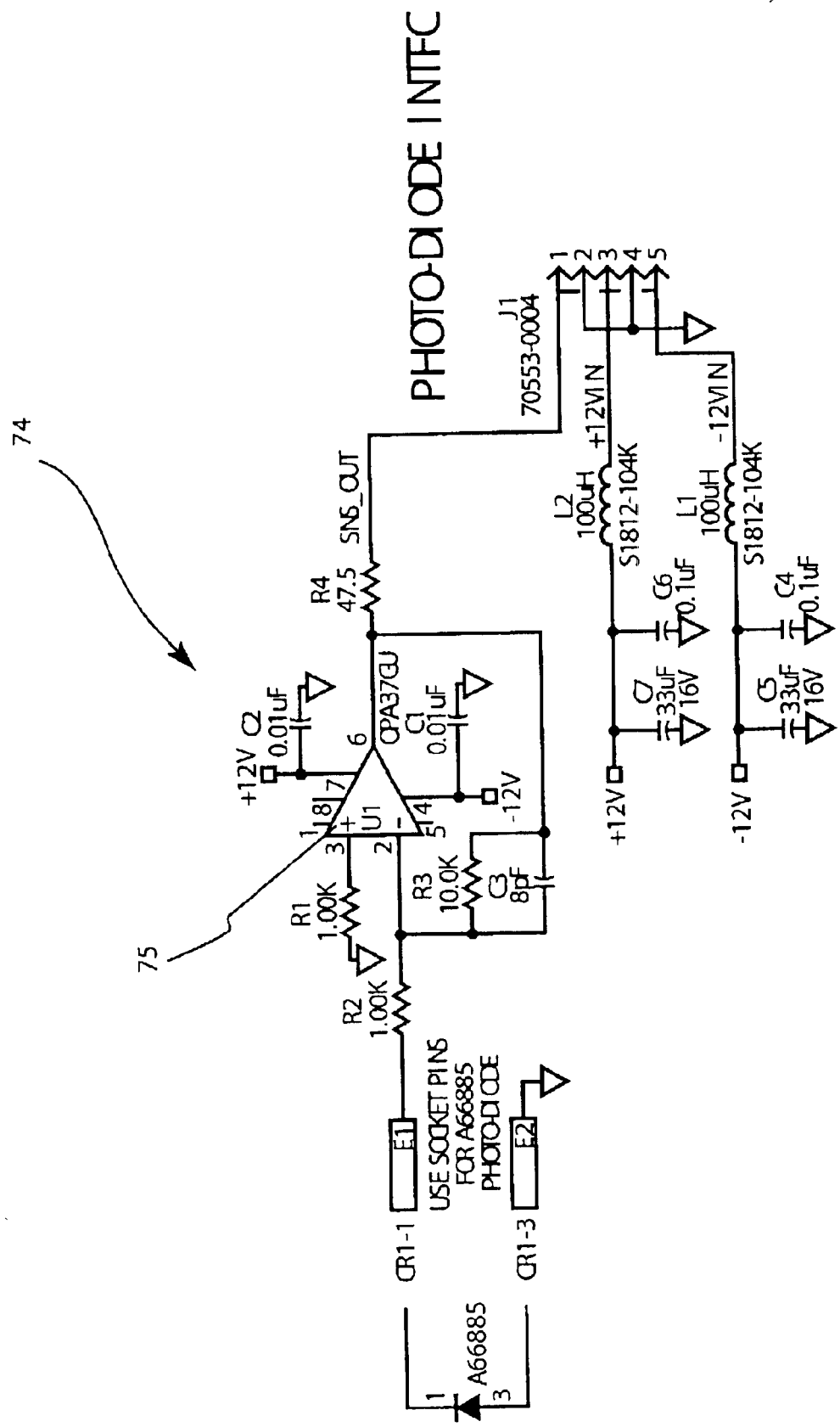
FIG. 3 is an electrical diagram of the amplifier.
Figure 4:
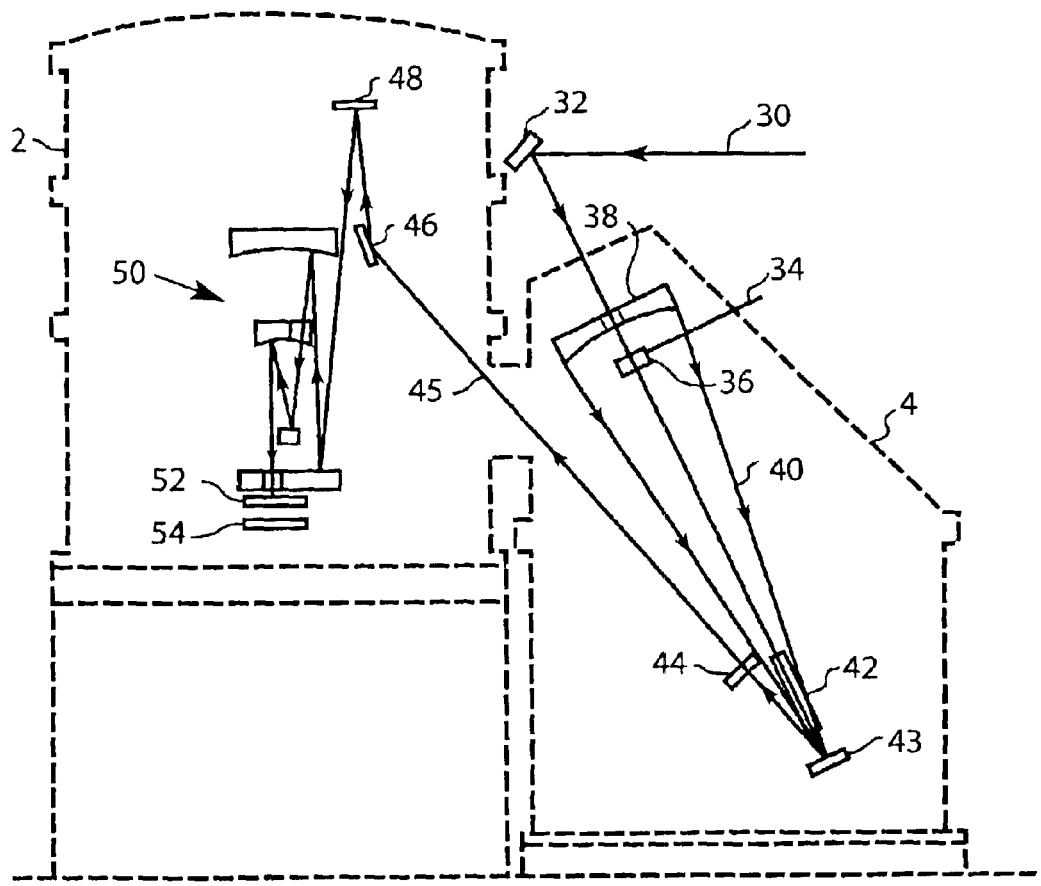
FIG. 4 is illustrates a prior art photolithography machine.

In one exemplary embodiment shown in FIG. 3, the amplifier assembly 74 is built around a high-speed operational amplifier 75 with a 35 MHz gain-bandwidth product. This amplifier 75 is d.c.-coupled to the diode 92 such that the same detector can be used in C.W. illumination experiments as well as high speed pulsed EUV illumination.

Note that the amplifier assembly uses extensive L-C power supply filtering to prevent the corruption of the photodiode signal from electronic noise. Also note that component R3 controls the gain of the amplifier assembly 74.

Mirror 70 is designed to reflect radiation at the wavelength(s) of interest, e.g., EUV radiation, from bore 66 into photodiode assembly 72. As is apparent, more than one mirror can be employed if desired. A preferred mirror comprises multilayer films consisting of alternating high refractive index and low refractive index materials. It is understood that the number of bilayers in the reflective multilayer can vary depending on the desired performance in terms of wavelength and angular and temporal bandwidth. A larger number of layers will provide higher reflectivity at the cost of lower angular and temporal bandwidth. For the multilayer reflection mirror, the number of layered pairs will typically range from about 10 to 200 and preferably from about 20 to 80. Moreover, the layer pairs will typically have a bilayer periodicity of about 2 nm to 100 nm and preferably from about 5 nm to 30 nm. By "periodicity" is meant the thickness of one bilayer. Typically, the height of the individual stack layers will range from about 0.2 to 0.8 times the total bilayer thickness and preferably from about 0.4 to 0.6 times the total bilayer thickness. Mirrors can be fabricated on a silicon wafer and then cut to the necessary dimensions by a wafer saw. The mirror is held at its calibrated angle with respect to the photodiode by the housing.

Universal EUV in-band detectors of the present invention substantially as illustrated in FIG. 1 were fabricated. The housing was made of nickel plated aluminum and the photodiodes used were from International Radiation Detectors, Inc. model HS5. The diode active area was coated with a 195 nm thick layer of zirconium. The photodiode assembly was constructed from a modified TO-5 transistor package. The pinhole diameter was 400 $\mu$m. Photodiode assemblies were calibrated with the synchrotron undulator beamline source (CXRO beamline 12.0.1.2 at the Advanced Light Source, Lawrence Berkeley National Laboratory) operating at a wavelength of 13.4 nm with a bandwidth $\lambda/\Delta\lambda$ of about 200. The photodiode response was 10.1 electrons per every incident 92.4 eV photon.

The detector included a single EUV radiation reflective mirror comprising a multilayer Mo/Si film that is tuned to reflect 92.4 eV light at a 45 degree angle. The bandwidth of this mirror is approximately 0.94 nm, thus the photodiode only detected a tuned spectrum of the EUV radiation that is presented to the photodiode.

The detector mirror of the present invention is particularly suited for measuring EUV intensities in a photolithography system. For example, the detector has been positioned to measure the EUV intensity at a laser-produced plasma source in a photolithography system described in "Extreme-UV Lithography Condenser," U.S. Pat. No. 6,210,865 to Sweatt et al. which is incorporated herein. Specifically, the Sweatt condenser system includes a set of six mirrors for collecting EUV radiation from a radiation source that forms a source image, and having correcting mirrors which are capable of translating or rotating, or both, one or more beams from said set of mirrors and which are capable of modifying the convergence of the one or more beams from said set of mirrors and/or the size of the source image. Detectors of the present inventor were positioned so that each bore of the housing of the detector was oriented facing the radiation source. The detector demonstrated an intrinsic calibration accurate to within +/−10% and an intrinsic precision of better than 1% with a lifetime exposure drift less than 1%.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A detector for detecting extreme ultraviolet (EUV) radiation that comprises:
   a. an EUV sensitive photodiode having a diode active area that generates a current responsive only to EUV radiation;
   b. one or more mirrors that reflect EUV radiation having a defined wavelength(s) to the diode active area;
   c. a mask defining a pinhole that is positioned above the diode active area, wherein EUV radiation, is imaged through the pinhole; and
   d. an amplifier that is responsive to the current generated by the diode active area.

2. The detector of claim 1 further comprising means for directing ELJV radiation toward the one or more mirrors.

3. The detector of claim 1 wherein the detector comprises a housing assembly that has:
   a. a chamber in which the EUV sensitive photodiode is positioned; and
   b. an entrance through which EUV radiation enters the chamber.

4. The detector of claim 3 wherein the housing assembly comprises an elongated member having a bore through which EUV radiation enters the chamber.

5. The detector of claim 4 wherein the bore has a cross sectional area of from about 0.2 $cm^2$ to 0.55 $cm^2$.

6. The detector of claim 1 wherein the diode active area is coated with an EUV-transmissive energy filter.

7. The detector of claim 6 wherein the EUV-transmissive energy filter comprises zirconium.

8. The detector of claim 6 wherein the EUV-transmissive energy filter comprises a bandpass filter.

9. The detector of claim 1 wherein each of the one or more mirrors comprises a multilayer film comprises alternating layers of a first material having a refractive index and a second material having a refractive index that is larger than that of the first material.

10. The detector of claim 9, wherein the multilayer film comprises about 10 to 200 layer pairs.

11. The detector of claim 10 wherein the layer pairs have a periodicity of about 2 nm to 100 nm.

12. The detector of claim 1 wherein each of the one or more mirrors comprises a multilayer film comprising alternating layers of molybdenum and silicon.

13. The detector of claim 1 wherein the pinhole has an area of from about 0.03 $mm^2$ to 0.13 $mm^2$.

14. The detector of claim 1 wherein the diode active area has an area of about 1 $mm^2$ to 4 $mm^2$.

15. A method of measuring EUV radiation intensity in a system that includes a source of EUV radiation that comprises the steps of:
  a. providing a detector that comprises:
    i. an EUV sensitive photodiode having a diode active area that generates a current responsive to EUV radiation;
    ii. one or more mirrors that reflect EUV radiation having a defined wavelength(s) to the diode active area;
    iii. a mask defining a pinhole that is positioned above the diode active area, wherein EUV radiation passing through the pinhole is restricted substantially to illuminating the diode active area; and
    iv. an amplifier that is responsive to the current generated by the diode active area;
  b. positioning the detector within the system so that the EUV radiation passes through the pinhole of the mask and illuminates the diode active area.

16. The method of claim 15 wherein the detector generates a signal corresponding to the intensity of the EUV radiation from the source.

17. The method of claim 15 wherein the detector includes means for directing EUV radiation toward the one or more mirrors.

18. The method of claim 15, where the detector comprises a housing assembly that has:
  a. a chamber in which the EUV sensitive photodiode is positioned; and
  b. an entrance through which EUV radiation enters the chamber.

19. The method of claim 15 wherein the source of EUV radiation is a laser-produced plasma source.

* * * * *